United States Patent [19]

Goldschmidt et al.

[11] 4,359,746
[45] Nov. 16, 1982

[54] ZERO LEVEL CORRECTION APPARATUS

[75] Inventors: Robert E. Goldschmidt, Needham; Charles C. Ku, Acton; David A. Townzen, Winchester, all of Mass.

[73] Assignee: Kaye Instruments, Inc., Bedford, Mass.

[21] Appl. No.: 256,571

[22] Filed: Apr. 22, 1981

Related U.S. Application Data

[62] Division of Ser. No. 71,947, Sep. 4, 1979, Pat. No. 4,329,693.

[51] Int. Cl.³ .................. G01D 9/00; G01G 19/52; G01G 23/14
[52] U.S. Cl. .................. 346/33 R; 177/50; 177/164
[58] Field of Search .............. 177/1, 50, 164, 165, 177/184, 185; 346/9, 33

[56] References Cited

U.S. PATENT DOCUMENTS

| | | | |
|---|---|---|---|
| 3,803,630 | 4/1974 | Belcher et al. | 346/33 MC |
| 3,810,188 | 5/1974 | Gross et al. | 346/33 MC |
| 3,986,012 | 10/1976 | Loshbough et al. | 177/165 X |
| 4,044,846 | 8/1977 | Matilainen | 177/165 |
| 4,155,411 | 5/1979 | Weaver | 177/165 |
| 4,231,439 | 11/1980 | Hall, Jr. et al. | 177/185 X |
| 4,316,516 | 2/1982 | Kupper | 177/50 X |
| 4,316,517 | 2/1982 | Jonath | 177/50 X |
| 4,316,518 | 2/1982 | Jonath | 177/50 X |

OTHER PUBLICATIONS

R. J. Laybourn, Display/Audit Printer, IBM Technical Disclosure Bulletin, vol. 18, No. 11, (Apr. 1976).
Gould, "Data Display", Brush Instruments, vol. 1, No. 2.

*Primary Examiner*—George H. Miller, Jr.
*Attorney, Agent, or Firm*—Rines and Rines, Shapiro and Shapiro

[57] ABSTRACT

This disclosure is concerned with a novel digital multipoint recorder that is microprocessor-controlled and enables impact printing from in back of the recorder paper to provide a front visible flat print-out of pages of on-line running summary data suited for operator viewing in industrial and similar locations, and providing a record for direct use in reports and logs.

5 Claims, 5 Drawing Figures

ZERO LEVEL CORRECTION APPARATUS

This is a divisional application of Ser. No. 71,947, filed Sept. 4, 1979, now U.S. Pat. No. 4,329,693.

The present invention relates to methods of and apparatus for data recording and the like, being more particularly directed to the recording of data such as that produced during measurement, control or production monitoring and similar operations, and documenting the recorded information in a format suitable for direct use in logs and reports and in related usages.

In many industrial, research and similar processes, it has long been desirable to have a data recording apparatus positioned where the operator can readily view the most recent values of important parameters under monitor, such as, for example, temperatures, pressures, flow rates, motor speeds, and many other quantities. The recorded data, moreover, must be presented in a manner which permits the operator to observe changes in the data, and the recorder apparatus itself must have a physical design which can operate reliably in industrial and similar environments. Among the recording apparatus heretofore used for such purposes have been the multi-point or pen recorder which printed a series of marks or a continuous line on a paper scroll, with the left-to-right location of the marks or lines representing the value of the data being recorded. This type of equipment, however, is subject to disadvantages of limited resolution, interpolation errors, and clogged pens, and the requirement for special recording chart paper. The operator, furthermore, is required to interpret the analog meaning of the record and to convert the same to digital value, where required.

It is also often necessary, in addition, that the parameters being recorded or logged for display to the operator be summarized in a form suitable for ultimate presentation in a written report or the like. A tabular form is often desirable. In the past, accordingly, the data has been extracted from the recorder charts and summarized or transcribed manually; or, in more elaborate systems, the data has been transmitted to a computer system in a different part of the plant to be summarized for inclusion in a report.

Other data logging apparatus has involved data acquisition in the form of digital printing on an adding machine-like tape; which not only involves the disadvantage of leafing through long tapes to determine trend comparisons and the like, but is decidedly unsuitable for direct use in reports.

A first important step in obviating some of these problems and disadvantages was provided by the "Digistrip" multipoint recorder of the assignee of the present invention, as described, for example, in Bulletin DR75 (July 6, 1975) of Kaye Instruments of Bedford, Mass.; this recorder employing impact paper recording of direct digital print-out. While improving upon direct process recording, this system was still restricted in the operator's visual access to the recording chart and in the quantity of data available at a glance for comparison, and did not provide on-line summaries or similar data compilations, and not in a format directly useable in reports and like documents.

An object of the present invention, therefore, is to provide a new and improved data recording apparatus and method that lend themselves to utilization particularly, though not exclusively, in industrial plant environments, and that obviate the above-mentioned and other problems, providing for the clear presentation of data which has been recorded in the recent past such that an operator can readily observe current values and trends, and in a digital, tabular format suitable for direct insertion in reports.

In accordance with the invention, it is important that the printed page be displayed clearly, including the last line of printout, and that the apparatus be designed to be compatible with other requirements of control room or other production or research environments. The front face of the apparatus should be reasonably flush, with the recorder chart flat against the same, and housed in an enclosure which can be mounted in the control panel of conventional identical instrumentation equipment racks. Another objective is to provide data recording apparatus which is as simple, yet as reliable as possible, and with the printer mechanism designed with a minimum of electro-mechanical parts, and the electronic circuitry, with minimum power dissipation and temperature rise performance within the semi-sealed enclosure.

A further object of the invention is to provide a novel digital multipoint recorder that is provided with recording and calculating capabilities that approach those of a mini-computer-based data acquisition system, embodying a microprocessor-aided page printer that produces an on-line running summary not only ideally suited for operator usage but for enabling the same record to be directly inserted into logs and reports.

Still another object is to provide such a novel recorder that is of particular advantage with temperature measuring apparatus and the like, among other sensors.

An additional object is to provide a new and improved recorder and sub-combination portions thereof of more general utility, as well.

Other and further objects will be explained hereinafter and will be more particularly delineated in the appended claims.

In summary, from one of its important aspects, the invention embraces printing apparatus for use with impact-sensitive paper having, in combination, means for mounting the paper as a continuous longitudinally extending substantially flat sheet to be directly viewed from one face thereof, print head means disposed at a predetermined location on the other face of the sheet, and means for causing the print head means to impact against the said other face along transverse lines at said predetermined location to produce visible printing on the said one face. Preferred or best mode embodiments, and details of the apparatus and sub-assemblies of the same, are hereinafter presented.

The invention will now be described with reference to the accompanying drawings, FIG. 1 of which is an isometric view, partly broken away to illustrate details of construction, of a preferred embodiment;

Figure 1:
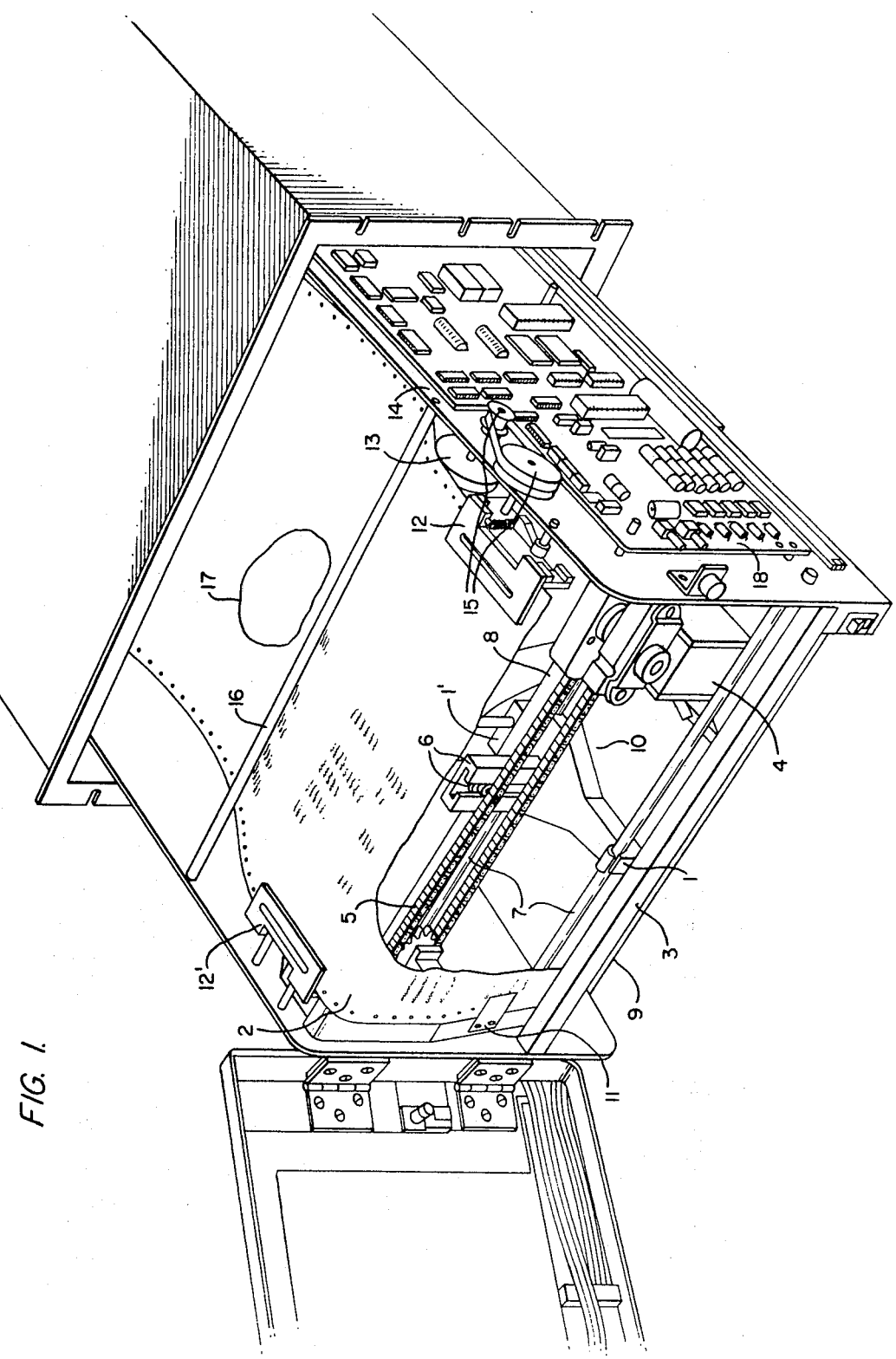

Referring to FIG. 1, the invention enables the before-mentioned highly desirable result of positioning the recorder printed page as close to the front face of the apparatus as possible for the most facile viewing by the observer, by positioning the print head 1 at a predetermined location near the bottom and on the opposite face of the paper 2 from the observer, such that it strikes or impacts upon the paper from the rear. The paper 2 is mounted to travel longitudinally vertically, traversing between the print head 1 and a platen 3 such that the impact force of the print head 1 is absorbed by the platen 3 through the paper 2. The print head 1 is transversely horizontally driven from side to side by a single motor 4 running in one direction. The motor 4 drives a chain 5 through a slider-pin mechanism 6, with the print head 1 riding upon a set of guides 7 to maintain constant spacing between the print head 1 and the platen 3. While the terms "vertically", "horizontally" and "bottom" are illustrative of a preferred orientation, they are generically used herein to connote equivalent relative positions, as well. Suitable impact-sensitive chart paper for enabling this reverse printing (ink-impregnated pressure sensitive, or the like) is, for example, type SC White #17 of NCR Corporation.

A light source and optical sensor 1', mounted rearwardly with the print head 1, detects, as the head transversely traverses the apparatus, alternate transparent and opaque vertical lines on a fixed transverse strip 8, extending beyond the width of the printed page, and serving as an optical fence, with one end completely opaque, and the other end completely transparent. A special electronic circuit detects each transition from transparent to opaque as a potential print position, and the printer logic will cause the appropriate character to be printed. When the print head 1 reaches either end region and does not detect a transition for a pre-determined period of time, an associated control circuit will continue to print the next line of data or turn off the motor if there is no further data to be printed. By sensing whether the strip is completely transparent or completely opaque, the printer logic is informed whether the print head 1 is at the left or right margin of the page so that, unlike other prior printing apparatus, there is no need to have separate sensors to determine when the print head 1 is at a margin, and to determine which margin.

The control logic is designed such that printing can occur with the print head 1 travelling in either transverse direction, so that it is not necessary to bring the print head 1 back to the left margin each time before starting a new line. The construction of the invention thus eliminates the typical carriage return operation of most printers. If the next line to be printed is already available, the motor 4 driving the print head 1 does not stop when a margin is detected, but it continues to drive the print head 1, and the slider-pin mechanism 6 automatically reverses the direction of the print head 1. With this type of mechanism, the next complete line to be printed is stored in the hereinafter described microprocessor memory before the printing operation of that line is started.

Exemplary components for this system are, for example, the Model IPM 129 print head of Victor Comptometer Corporation, which includes an optical sensor.

Another important feature of the invention enabling its novel results resides in the paper feed and take-up mechanism contained within the instrument enclosure. Paper moves continuously from the paper supply tray 10 through paper guides 9. It then passes between the platen 3 and the print head 1, as before described, vertically upward as a substantially flat sheet through a paper tension mechanism such as side friction clips 11 to the set of feed tractors 12, 12' which pull the paper from the feed tray when a new line has been printed and position it at the proper location for the next line. The print head 1 and the platen 3 must be oriented so that the motion of the flat sheet of paper by one vertical line space will move the previous printed line into view. This permits an observer immediately to view the current data which has just been printed, unlike other types of printers. In order to maintain even line spacing, the tension clips or other mechanism 11 must maintain proper and uniform tension on the paper at the bottom of the apparatus, the same also preventing the paper from moving in the left-to-right direction and thereby providing a printed page with the desired vertical column alignment. The paper tractors 12, 12' are operated by a single stepping motor 13 through belt 14 and pulley drive mechanism 15.

Details of the printer mechanism, carriage controls, sensor and other circuit and constructional details are not presented in order to avoid detracting from the novel features of the invention with well-known mechanisms; but reference to other suitable constructions is made, for example, to the Kaye Instruments "Digistrip Recorder Installation, Operation and Maintenance Manual", dated April 1978.

The electrical circuit to drive the stepping motor 13 has been designed in accordance with the best mode of the invention to minimize the power dissipated, thereby minimizing the temperature rise of the motor and the interior of the semi-sealed enclosure. The stepping motor drive circuit preferably operates under the principle of pulse-width modulation of the voltage across the stepping motor, as later described in connection with the preferred form of FIG. 2. During the time the tractor mechanism is at rest, a very low duty cycle pulse train is used to provide detent action of the mechanism. During the time the tractor mechanism is advancing the paper, a full duty cycle with a voltage which is higher than—more than twice—the rated voltage of the stepping motor is used to provide maximum and higher-than-rated torque. The stepping motor 13 is accordingly operated with lower power consumption when stationary than when moving to attain the above results. Another feature of this circuit allows positioning of the page to be maintained during a power-off/power-on sequence. This facilitates the pagination of the paper even if a power failure occurs.

A typical stepping motor suitable for use in accordance with the invention, such as the Series 82700 of North American Philips Controls Corporation, is divided into two sections, each of which has two sets of windings. In the circuit shown in FIG. 2, the first section contains windings 37 and 39, and the second section, windings 41 and 43. Each winding is driven by a drive circuit D the output of which is the collector of a transistor in the common-emitter configuration. When each drive circuit D is activated, current flows from the supply voltage $V_D$ through the corresponding motor winding and through the output transistor to ground. When the driver is deactivated, the current flowing through the winding inductance is shunted back to $V_D$ through a corresponding shunt diode d. This current will decay to zero in a few milliseconds due to the winding resistance and the diode forward voltage drop.

During normal operation one winding of each section is activated. Stepping is performed by making a transition from one winding to another in one section. The next step would be performed by making a transition in the other section. Flip-flop 31 controls which of windings 37 or 39 is activated, while flip-flop 32 controls which of windings 41 or 43 is activated.

Figure 2:
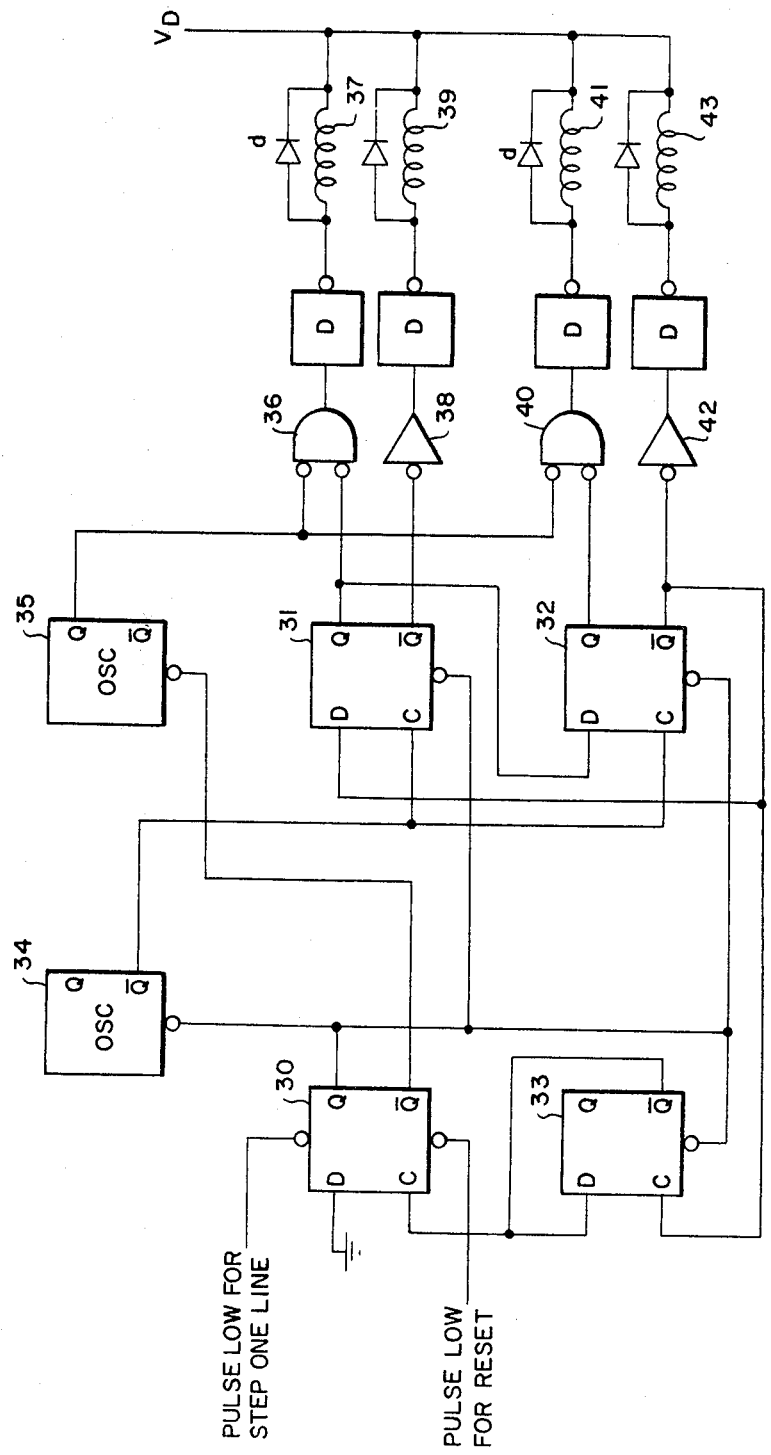
FIG. 2 is a combined block and schematic circuit diagram of the paper drive for the system of FIG. 1.

The circuit of FIG. 2 is placed in its quiescent or non-stepping state by the reset input to edge-triggered flip-flop 30, or as a natural result of the completion of a step operation. Flip-flop 30 serves as a master control in association with oscillators 34 and 35 and resets further flip-flops 31, 32 and 33. While in the quiescent state, the flip-flop 30 is in the off state, and, in turn, resets flip-flops 31, 32 and 33, and resets oscillator 34 and enables oscillator 35. Oscillator 35 has a time asymmetrical output which is low for 10 microseconds ($\mu$sec) and high for 500 $\mu$sec. In the quiescent state, only windings 37 and 41 are activated. The drivers place $V_D$ across windings 37 and 39 for 10 $\mu$sec out of each 500 $\mu$sec period. The current in the windings 37 and 41 does not fall to zero, however, since the winding inductance in combination with the associated shunt diode d keeps current flowing between drive pulses. In this manner, sufficient current is provided to the stepping motor to provide detent action on the paper while the power dissipated is greatly reduced from that required during stepping. Thus, $V_D$ can be two or more times the rated voltage of the stepping motor without causing overheating.

Figure 3:
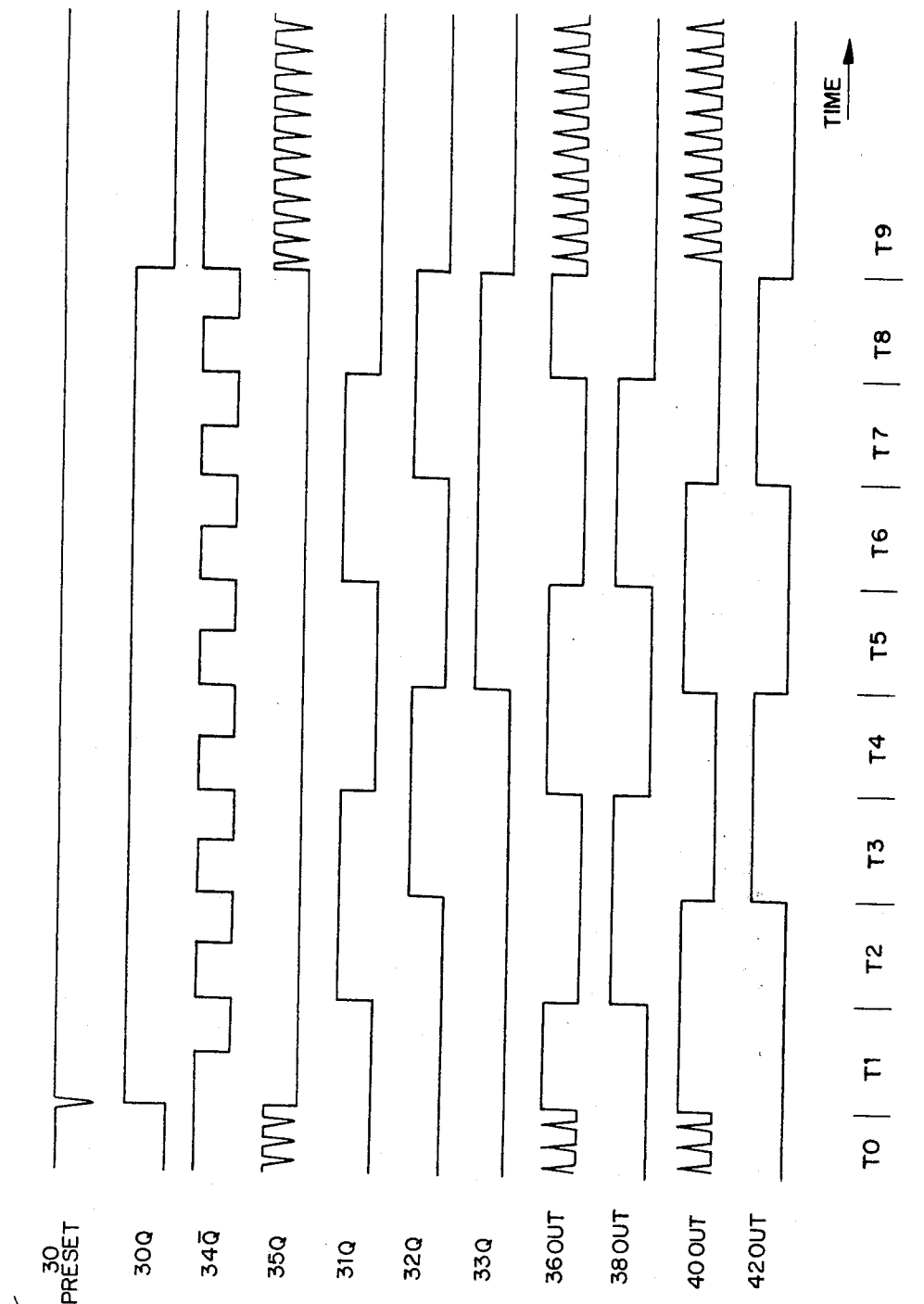
FIG. 3 is a waveform diagram relating to the performance of FIG. 2.

When the preset input to master control flip-flop 30 is pulsed, as shown in the top waveform "30" of FIG. 3, the stepping operation is initiated. For this mechanism, eight transitions of the winding drive circuits are required to move the paper one line space, FIG. 3 indicating the sequence of events for the line space operation, with time periods $T_0$ through $T_9$ indicated at the bottom. At time $T_0$, the circuit is in the quiescent state with the output of gate circuits 36 and 40 pulsed by the output 35Q, FIG. 3, of oscillator 35, FIG. 2. When the preset pulse is received, flip-flop 30 turns on at 30Q, oscillator 35 is reset and oscillator 34 is enabled at 34$\overline{Q}$. Oscillator 34 has a period of approximately 10 msec, and the voltage $V_D$ is placed across windings 37 and 41 with full 100% duty cycle. This brings the winding currents up to a high level to maximize stepping torque. Oscillator 34 clocks respective flip-flops 31 and 32 at 31Q through the necessary sequence of outputs. After four oscillator pulses from 34$\overline{Q}$, flip-flop 33 turns on as shown at 33Q. After an additional four oscillator pulses, flip-flop 33 turns off, in turn turning off master control flip-flop 30 and placing the control circuit in the quiescent state once again. The outputs of gates 30 and 40, respectively operating through the drivers D connected with windings 37 and 41, are shown at 36 Out and 40 Out in FIG. 3; and the outputs of circuits 38 and 42, respectively connecting the $\overline{Q}$ outputs of flip-flops 31 and 32 to operate the drivers D connected to windings 39 and 43, are illustrated at 38 Out and 42 Out, respectively.

The reset input to the master control flip-flop 30 is used to prevent partial stepping of the circuit when power is turned on by immediately placing the circuit in the quiescent state, thus preventing stepping when power is turned on and, in turn, facilitating the pagination process whereby the paper is held in the same position after a power failure as when power failed.

Unlike conventional line printers, which have available a large vertical descent to facilitate folding the fanfold paper in the proper fashion, the apparatus of the present invention embodies special means to assure a proper folding of the paper within the limited dimensions of the enclosure. These means include an upper electro-static discharge and guide bar 16 and a paper receiver tray 17 which, in accordance with the invention, must be positioned at a rather critical angle inclined to the horizontal of between substantially 10° and 20°, in order to fold the paper properly with a very limited vertical drop of less than, say, 7 inches, more or less. With fanfold type paper, and the paper receiving tray thus located at such a height of less than about 7 inches below the maximum vertical height of the path travelled by the paper, the inclination of the said tray toward the direction from which the paper issues at the said acute angle from the horizontal causes the automatic folding storage.

A feature which is not essential to the operation of the apparatus, but which adds a desirable character of low noise, is a platen 3 constructed of a composite of alternating metallic strips and vibration-damping material.

The electronics to control all printer operations is shown on a single printed circuit board 18 containing a microprocessor and all of the required logic and memory. The printer mechanism can, of course, operate independently of the data acquisition portion of the apparatus, if so desired.

Figure 5:
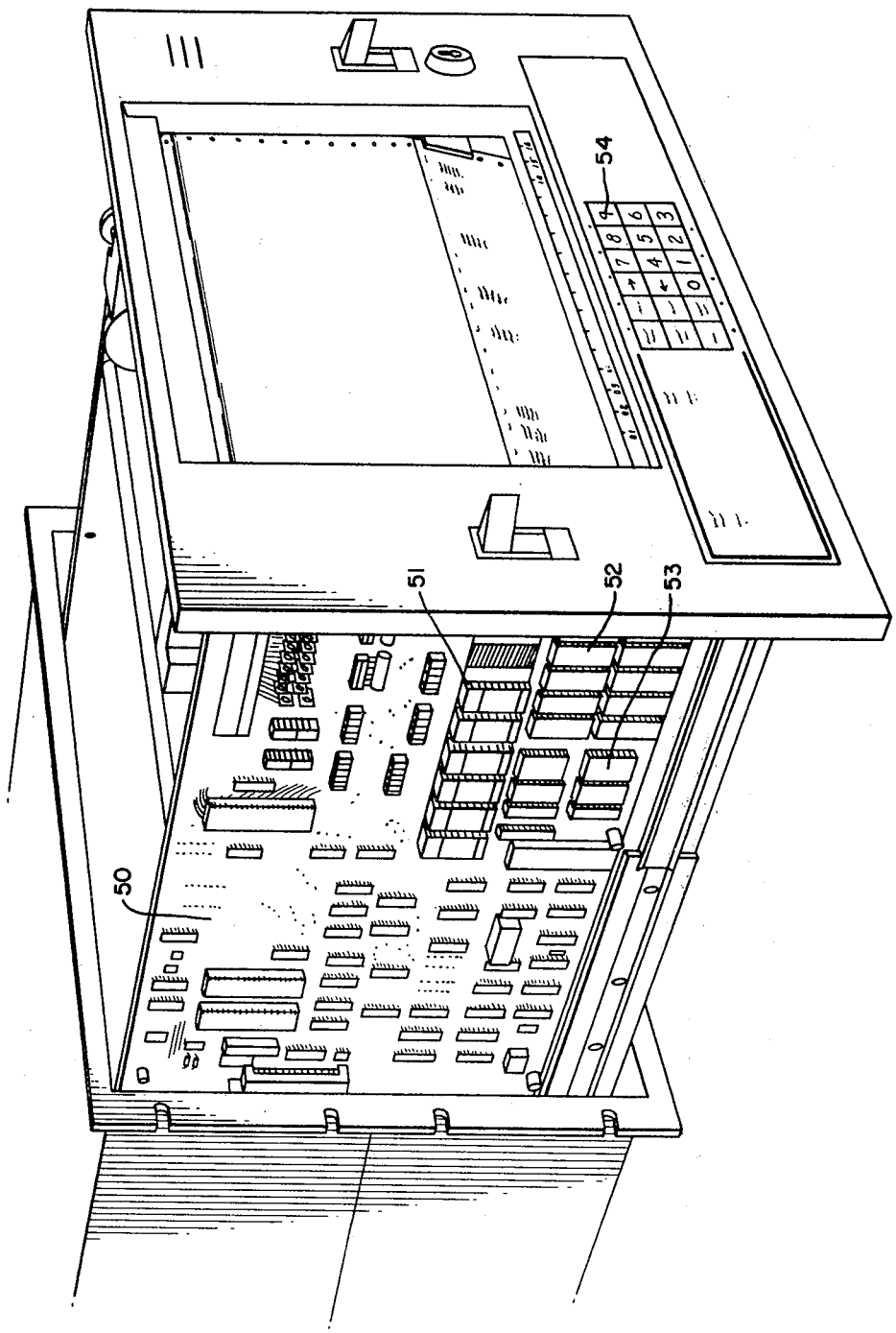
FIG. 5 is an isometric view showing the front door and data acquisition board of the recording system.

Referring to FIG. 5, the data acquisition portion on printed circuit board 50 has an independent microprocessor which controls all operations other than the printing of the data. In accordance with a preferred form of the invention, three types of memory are employed in the data acquisition logic. The read-only memory portion 51 is used to store permanently the programmed instructions to direct the data acquisition functions, and also contains tables which are used for conversion of digital voltage data into the proper engineering data. A second portion of memory 52, called non-volatile random access memory is used to store user-programmed parameters such as the types of input, the frequency of printing, acceptable limits of data and identifying headers to be printed at the top of each page. The third type of memory 53 is called random access memory and is used to store the real-time data being processed from the analog inputs to the system, as is well-known.

The overall structure of the microprocessor logic on printed circuit board 50 is preferably directed by a "task manager" of the type described in an article entitled "A Task-Scheduling Executive Program for Microcomputer Systems" by David A. Townzen, appearing in *Computer Design*, June, 1977, pp. 194–202. This task manager is an efficient means of controlling task priorities so that a more important task of higher priority will temporarily interrupt a task of lesser priority in order to provide service on a real-time basis.

Suitable microprocessor apparatus is the type 8085 manufactured by Intel Corporation, with memory of the types 2716, 2114 and 5101 of Intel Corporation, or other equally well-known microprocessor apparatus.

As an example of a resulting page of summary data directly useable for reports and the like and stemming from the microprocessor-printer of the invention ($8\frac{1}{2} \times 11$ inch fanfold paper, for example), up to five lines may be made available on the sheet for customized header identification, each line having 128 characters corresponding to a field of 8 characters for each of 16 channel positions. Conventional customer-programmed alpha-numeric messages can be introduced to a conventional keyboard 54, located at the bottom of the front panel of FIG. 5, for example, such that the microprocessor enables the automatic printing of the same at the top of every new fanfold page sheet. Suitable keyboard control is provided by a Brady Corporation Lite Touch TM panel operating in conjunction with an Intel Corporation type 8279 keyboard interface module. Programming of the header takes only a few minutes using such front panel keyboard entry. The apparatus may provide one to four lines of data, for example, to be printed in normal engineering units as a block, with a blank line inserted after each block to separate the data corresponding to a single scan, if desired. When there are too few lines remaining at the bottom of a page to print a complete block, the program may enable the paper automatically to advance to the top of the next page for header printing. The header printout may also automatically include a day's register printout in the time field locations. Alarms may be indicated by an asterisk printed in the data field of the alarm channel, and the types of printed data may be identified by an alphabetic character representing the appropriate engineering units, and matching that used on the front panel display, printed as the last character in each channel's data field. Not counting header and margin space, approximately 40 lines per page can be available with the above-described fanfold paper for recording data. With 16 channels printed per line, 96,000 readings can be recorded on a typical stack of paper having about 150 pages.

The use of a microprocessor and its associated logic permits each user to program the apparatus to satisfy particular requirements most effectively, and also makes possible several new and important features in the data acquisition portion of the apparatus of the invention; in particular, a novel technique for automatically assuring that the analog-to-digital conversion circuit maintains a proper zero level. To illustrate this feature, the example of the before-mentioned most advantageous use of the recorder system of FIGS. 1, 4, and 5 with temperature sensors, such as thermocouple arrays, will be presented.

Figure 4:
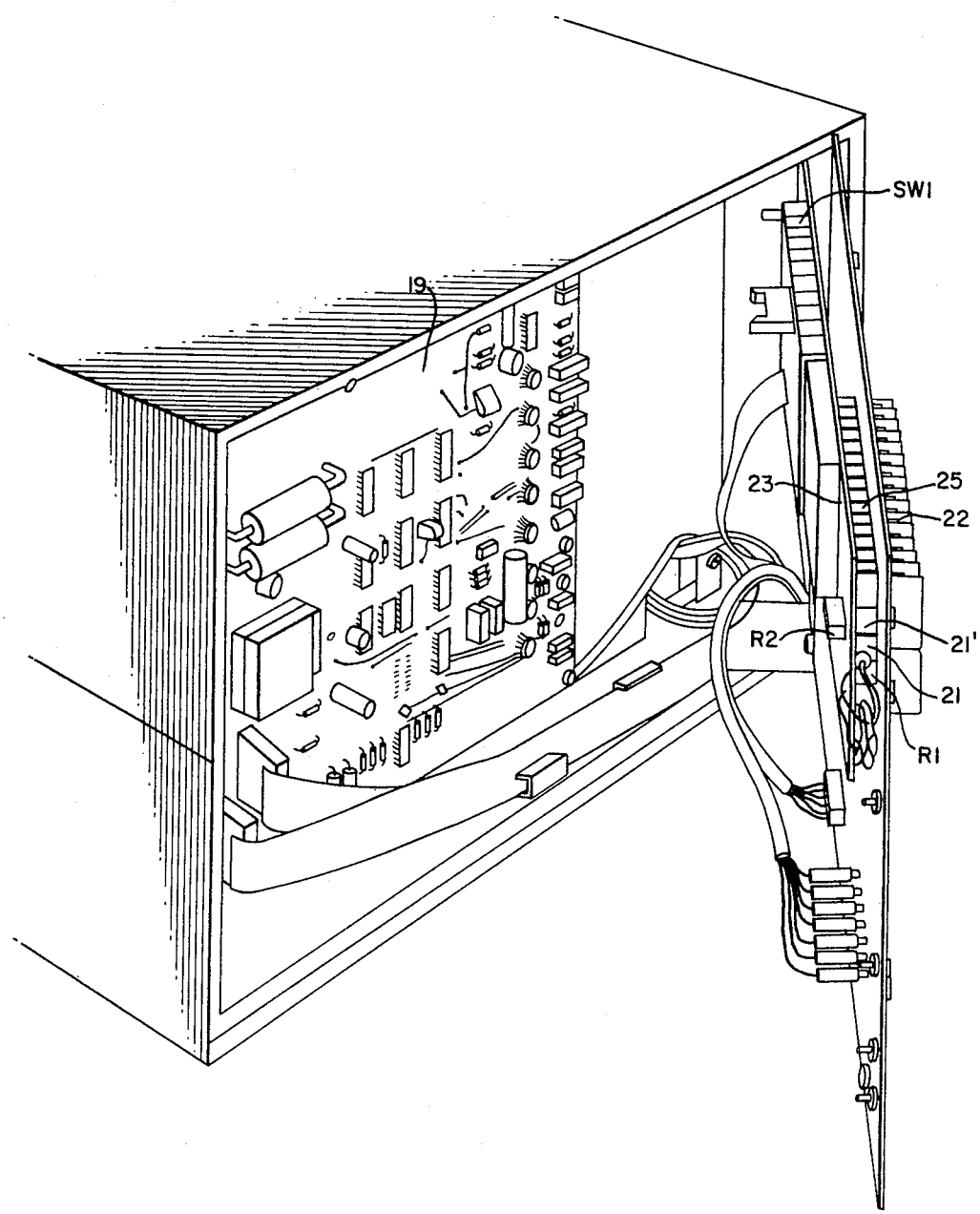
FIG. 4 is a fragmentary isometric view showing the utilization of the recording system of FIG. 1 with a temperature-sensing array.

An analog-multiplexer 23, shown in FIG. 4, is provided with one extra switch SW1 with a known zero voltage input. The microprocessor logic is designed, as is well known, to read that extra input periodically during the multiplexing sequence, convert same to digital form by means of an analog to digital converter 19, and store the value as an offset which must be subtracted from the other input voltages. In order to obtain greater stability of the zero level, several successive readings of this zero input are maintained in memory and averaged. The average offset is subtracted from all other input signals. Suitable averaging and subtracting is performed by the microprocessor.

In the exemplary showing of application to thermocouple sensing, FIG. 4 also illustrates an improvement in the art of uniform temperature references for thermocouple inputs such as that described in U.S. Pat. No. 3,648,523. The sensor system of FIG. 4 employs a bar 21 of a highly thermal conductive material, such as aluminum, having opposing flat surfaces provided with a thin insulating coating on the surface 21', such as aluminum oxide, and which is in intimate thermal contact with the printed circuit board mounting screw terminal shafts 25 of all of the input terminals 22. The design permits the insertion of these terminals into a printed circuit board 23 and the insertion of a temperature sensor R1 into the highly conductive bar so that all terminals, as well as sensor R1, are maintained at very nearly the same or equal temperature. The sensor which monitors the terminal temperature is read as a separate input.

In accordance with this improvement, moreover, a single temperature-sensitive resistor R1 made of a material having known resistivity versus temperature characteristics is placed in series with a manually-adjustable resistor R2. A precision voltage source V maintains a constant voltage across the series connection of the two resistors. With the temperature sensitive resistor R1 at a known temperature, the other resistor R2 is manually adjusted to provide a pre-determined value of voltage across the temperature-sensitive resistor. This single adjustment assures that the proper value of voltage will be produced across the temperature sensitive resistor at all temperatures within the operating range of the apparatus.

The microprocessor logic before described automatically adds the proper reference voltage for each type of thermocouple corresponding to the temperature of the input terminals as determined by reading the value of voltage appearing across the temperature-sensitive resistor.

While the incorporation of these improvements with the microprocessor control of the novel recorder of the invention has been illustrated by reference to temperature measurements, moreover, it will be apparent that other types of sensors, controls and data-generating sources may also be readily employed with the novel digital multipoint recording technique and system of the invention; and that further modifications will also suggest themselves to those skilled in this art, and are considered to fall within the spirit and scope of the invention as defined in the appended claims.

What is claimed is:

1. For use with printing apparatus and the like for recording digital data generated from analog input voltages supplied to an input of the printing apparatus from sensing means, zero level correction apparatus for correcting for zero-offset of the digital data generated from such analog input voltages comprising means for periodically connecting the input to one of known zero voltage, means for storing a multiplicity of the resulting digital values, means for averaging the values thus stored to determine an offset value, and means for digitally subtracting the same from the digital data generated from said analog input voltages from the sensing means when connected to said input.

2. Apparatus according to claim 1, wherein said digital data is generated by an analog-to-digital converter.

3. Apparatus according to claim 1, wherein said averaging means and said subtracting means comprise a microprocessor.

4. Apparatus according to claim 1, wherein said connecting means comprises analog multiplexer switch means receiving said analog input voltages and said known zero voltage, the analog multiplexer switch means having an output connected to said input, and means for controlling the analog multiplexer switch means so as to connect one of said analog input voltages or said known zero voltage to said output.

5. Apparatus according to claim 4, wherein said controlling means comprises a microprocessor.

* * * * *